(12) United States Patent
Singaravelu et al.

(10) Patent No.: US 9,921,864 B2
(45) Date of Patent: Mar. 20, 2018

(54) DYNAMIC HOST PERFORMANCE TUNING OF A NETWORK STACK

(71) Applicant: VMware, Inc., Palo Alto, CA (US)

(72) Inventors: Lenin Singaravelu, Sunnyvale, CA (US); Chien-Chia Chen, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 197 days.

(21) Appl. No.: 14/747,472

(22) Filed: Jun. 23, 2015

(65) Prior Publication Data

US 2016/0253192 A1    Sep. 1, 2016

Related U.S. Application Data

(60) Provisional application No. 62/121,331, filed on Feb. 26, 2015.

(51) Int. Cl.
*G06F 15/16*    (2006.01)
*G06F 9/455*    (2018.01)
*H04L 12/26*    (2006.01)

(52) U.S. Cl.
CPC ...... *G06F 9/45537* (2013.01); *G06F 9/45558* (2013.01); *H04L 43/08* (2013.01); *H04L 43/16* (2013.01); *G06F 2009/45579* (2013.01); *G06F 2009/45591* (2013.01)

(58) Field of Classification Search
CPC . G06F 9/45533; G06F 9/45558; H04L 43/08; H04L 43/16
See application file for complete search history.

(56) References Cited

U.S. PATENT DOCUMENTS

| | | | |
|---|---|---|---|
| 6,189,066 B1 * | 2/2001 | Lowe | G06F 13/24 710/260 |
| 8,984,526 B2 * | 3/2015 | Garg | G06F 9/5083 718/1 |
| 2014/0007093 A1 * | 1/2014 | Deshpande | G06F 9/45533 718/1 |
| 2014/0025823 A1 * | 1/2014 | Szabo | H04L 43/16 709/226 |
| 2014/0082616 A1 * | 3/2014 | Kurita | G06F 9/45558 718/1 |
| 2014/0373010 A1 * | 12/2014 | Folco | G06F 9/45533 718/1 |

* cited by examiner

*Primary Examiner* — Nam Tran
(74) *Attorney, Agent, or Firm* — Patterson + Sheridan LLP

(57) ABSTRACT

A tuning engine for a virtualized computing system is described that periodically collect performance metrics from the virtualized computing system, and detects whether a change in system state has occurred based on the collected metrics. The tuning engine may determine whether the virtualized computing system is densely virtualized, and accordingly modify operations and configuration settings of various components in charge of handling networking for the virtualized computing system.

22 Claims, 3 Drawing Sheets

DYNAMIC HOST PERFORMANCE TUNING OF A NETWORK STACK

CROSS-REFERENCE TO RELATED APPLICATION(S)

This application claims the benefit of U.S. Provisional Patent Application No. 62/121,331, filed Feb. 26, 2015, the entire contents of which are incorporated by reference herein

BACKGROUND

A virtual machine (VM) is a software abstraction—a "virtualization"—of an actual physical computer system. As such, each VM will typically include a virtual CPU, a virtual mass storage disk, a virtual system memory, a virtual operating system (which may simply be a copy of a conventional operating system), and various virtual devices such as a network connector, in which case the virtual operating system will include corresponding drivers. All of the components of the VM may be implemented in software using known techniques to emulate the corresponding components of an actual computer.

If the VM is properly designed, then it will not be apparent to the user that any applications running within the VM are running indirectly, that is, via the virtual operating system and virtual processor. Applications running within the VM will act just as if they would if run on a "real" computer. Executable files will be accessed by the virtual operating system from the virtual disk or virtual memory, which will be simply portions of the actual physical disk or memory allocated to that VM. Once an application is installed within the VM, the operating system running inside the VM, referred to as a "guest operating system" (or "GOS") retrieves files from the virtual disk just as if they had been pre-stored as the result of a conventional installation of the application. The design and operation of virtual machines is well known in the field of computer science.

Some interface is usually required between a VM and some underlying host operating system and hardware (in particular, the CPU), which are responsible for actually executing VM-issued instructions and transferring data to and from the actual memory and storage devices. A common term for this interface is a "virtual machine monitor" (VMM). A VMM is usually a thin piece of software that runs directly on top of a host, or directly on the hardware, and virtualizes all, or at least some of, the resources of the machine. The interface exported to the VM is then the same as the hardware interface of the machine, or at least of some machine, so that the virtual OS cannot determine the presence of the VMM. The VMM also usually tracks and either forwards (to some form of operating system) or itself schedules and handles all requests by its VM for machine resources, as well as various faults and interrupts.

In some conventional systems, the VMM runs directly on the underlying hardware, and will thus act as the "host" operating system for its associated VM. In other prior art systems, the host operating system is interposed as a software layer between the VMM and the hardware. The implementation and general features of a VMM are known in the art.

One difficulty inherent in the nature of virtualization is that it complicates the need for management and governing of CPU, memory, and I/O resources. Not only are the VM and the VMM in themselves software components that require disk space and CPU time, but each VM acts as a "computer" in its own right, and thus duplicates the demand for resources made by the "host" system in which it is loaded. The demand for adequate resource may particular be felt in the network stack, the set of components in a virtualized computing system responsible for handling the transmission and receipt of network packets between VMs and the network. While conventional system may handle a wide variety of use cases of network load, there are challenges in configuring a system for performance when a virtualized computing system is densely virtualized (i.e., having many virtual machines on fewer physical computing resources)

SUMMARY

Embodiments of the present disclosure provide a method, non-transitory computer-readable storage medium, and a computing system. The method includes receiving performance metrics associated with at least one virtual machine (VM) executing on a host, and determining that the host is in a densely provisioned state based on a comparison of at least one performance metric to a corresponding threshold. The method further includes modifying scheduling of at least one process thread configured to handle emulating networking for the VM executing on a host, and determining that the host is in a densely provisioned state. The method further includes modifying configurations of a physical network interface underlying a virtual network interface card of the VM executing on a host, and determining that the host is in a densely provisioned state.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
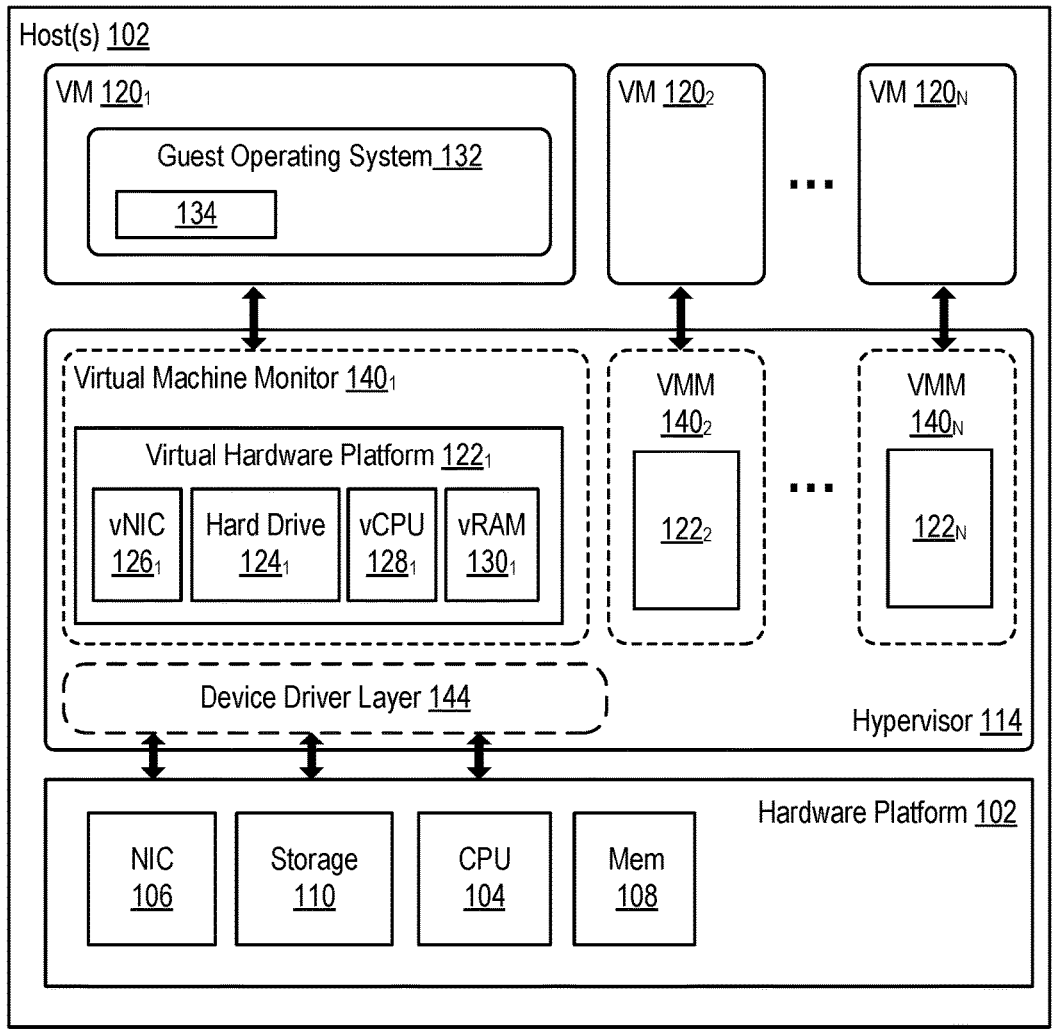
FIG. 1 is a block diagram that illustrates a computer system in which one or more embodiments may be utilized.

FIG. 1 depicts a block diagram of a virtualized computer system in which one or more embodiments of the present disclosure may be practiced. Host computer system 100 may be constructed on a desktop, laptop or server grade hardware platform 102 such as an x86 architecture platform. The hardware platform includes a one or more CPUs 104, a network adapter (NIC 106), system memory 108, and other I/O devices such as, for example and without limitation, a mouse and keyboard (not shown in FIG. 1). Data storage for host computer 100 may be provided a storage area network (SAN), which includes a storage array (e.g., a disk array). In addition, distributed storage systems other than SAN, e.g., network attached storage, may be used. Also, in some embodiments of the invention, local storage, such as a hard disk drive, may be used.

A virtualization software layer, also referred to hereinafter as hypervisor 114, is installed on top of hardware platform 102. Hypervisor 114 supports a virtual machine execution space within which multiple virtual machine (VM) processes may be concurrently executed to instantiate VMs $120_1$-$120_N$. For each of VMs $120_1$-$120_N$, hypervisor 114 manages a corresponding virtual hardware platform (i.e., virtual hardware platforms $122_1$-$122_N$) that includes emulated hardware such as virtual hard drive $124_1$, virtual NIC $126_1$, virtual CPU $128_1$ and guest physical RAM $130_1$ for VM $120_1$. For example, virtual hardware platform $122_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 132 to execute any supported application in application layer 134 for VM $120_1$. In alternate embodiments, guest operating system 132 may be a specially designed or modified operating system for execution on a paravirtualization platform. Such paravirtualization can sometimes provide performance advantages over pure x86 emulation. Device driver layers in guest operating system 132 of VM $120_1$ includes device drivers 144 that interact with emulated devices in virtual hardware platform $122_1$ as if such emulated devices were the actual physical devices. Hypervisor 114 is responsible for taking requests from such device drivers 144 and translating the requests into corresponding requests for real device drivers in device driver layer 144 of hypervisor 114. The device drivers in device driver layer 144 then communicate with real devices in hardware platform 102.

For example, hypervisor 114 takes requests to handle network packets transmitted or received by emulated network devices, such as vNIC 126, in virtual hardware platform $122_1$, and translates the requests into corresponding network interrupts for real NIC drivers in device driver layer 144 of hypervisor 114.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate from VMMs $140_1$-$140_N$, and VMMs $140_1$-$140_N$ may be considered to be separate from hypervisor 114. One example of hypervisor 114 that may be used is included as a component of VMware's ESX™ product, which is commercially available from VMware, Inc. of Palo Alto, Calif. It should further be recognized that other virtualized computer systems are contemplated, such as hosted virtual machine systems, where the hypervisor is implemented in conjunction with a host operating system. Instead of being within hypervisor 114, physical device drivers 144 may reside in a special "domain zero," "parent partition," or other specially-designated and privileged virtual machine (not shown) as implemented for example, in alternate compute hypervisors such as Hyper-V, available from Microsoft, Inc., or Xen, available from Citrix, Inc.

In traditional approaches to virtualization, the network stack of hypervisor 114 is generally configured and tuned to balance the tradeoffs between CPU cost and latency to provide good performance across a wide variety of usage scenarios. This wide focus might eliminate the need for most users to tune the network stack. However, such a design has drawbacks, namely, inflexibility. For some particular workloads, additional fine tunings are necessary in order to extract better performance from the virtualized computing system. For example, for highly latency-sensitive workloads, some configuration settings (e.g., VM settings and host configurations) can be made to reduce or avoid the impact of some CPU cost optimizations that could hurt latency. In another example, other configuration settings can be made to reduce CPU cost and/or other virtualization overhead, for users that prefer to trade some latency for a higher VM consolidation ratio (i.e., the number of VMs that can run on each host). In addition, such configuration changes and tunings may end up delivering worst performance when the system state or load changes. For example, a system previously tuned to consolidate more VMs might shift to run a lower workload that requires better networking throughput. Further, for a large-scale data center, configurations and tunings on a per-VM basis, become inefficient, costly, and cumbersome.

Accordingly, embodiments of the present disclosure provide a mechanism for dynamically configuring host and VM settings based on performance metrics to achieve higher VM consolidation ratios (thus lowering CPU cost) without sacrificing performance under regular use cases.

Figure 2A:
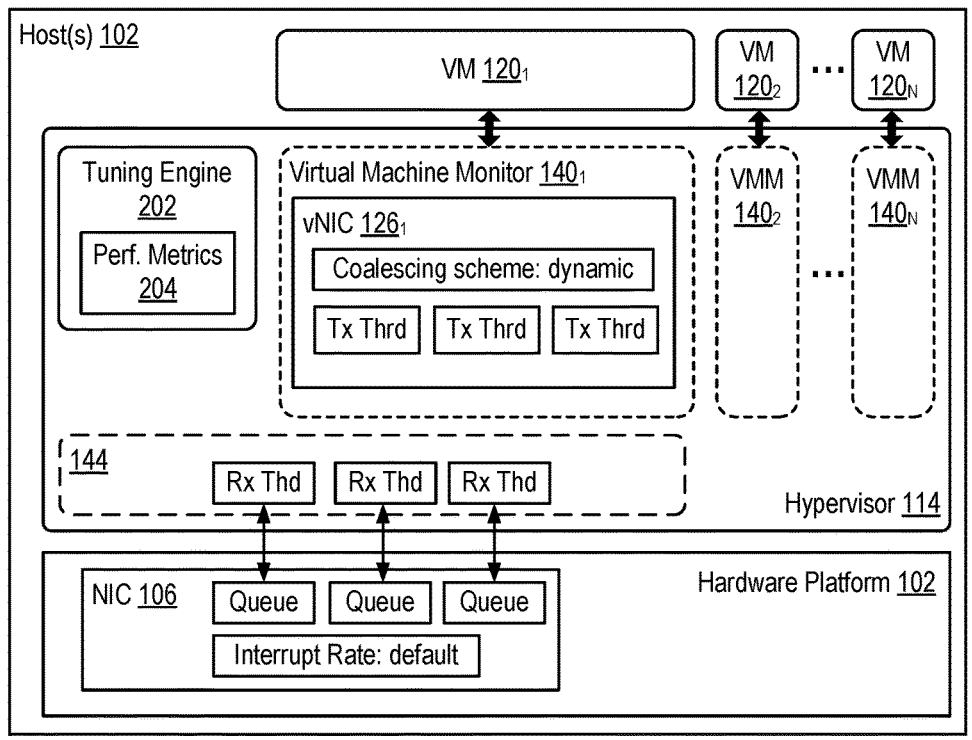
FIGS. 2A and 2B are block diagrams depicting tuning operations of a virtualized computer system, according to embodiments of the present disclosure.
Figure 2B:
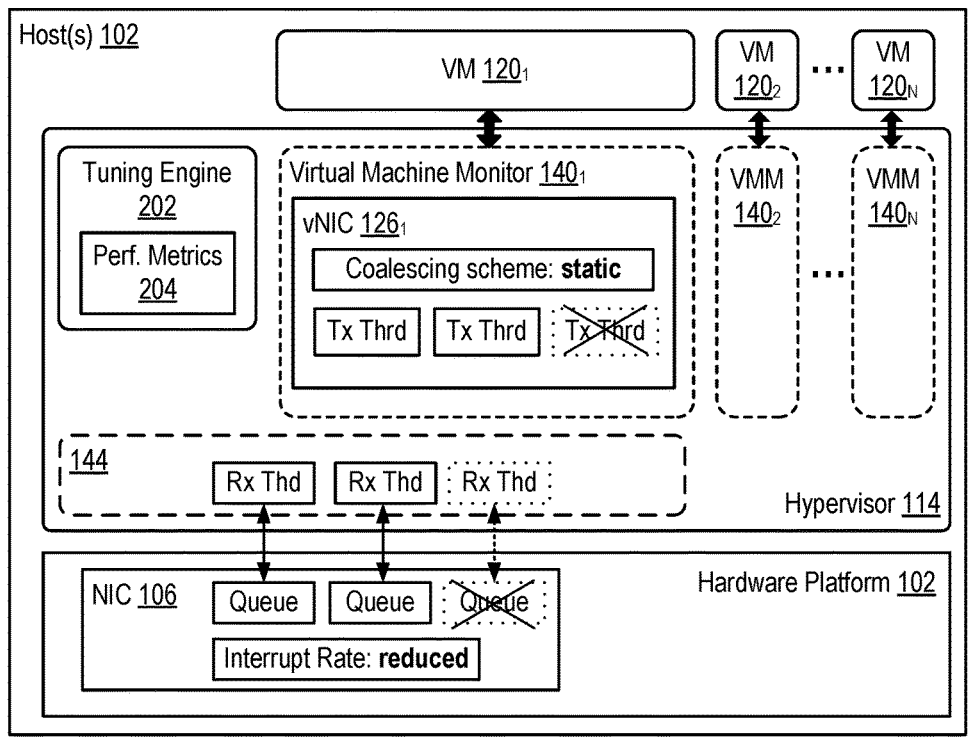

FIGS. 2A and 2B are block diagrams depicting tuning operations of a virtualized computer system, similar to the virtualized computer system of FIG. 1. As shown in FIG. 2A, the system includes a tuning engine 202 having a system monitor configured to periodically collect performance metrics 204 and other statistics related to resource utilization from various modules within hypervisor 114. Performance metrics 204 include metrics indicating utilization of hardware resources in hardware platform 102 (e.g., physical CPU 104, memory 108, network 106, etc.), and utilization of virtualized resources of virtual hardware platform 122. Tuning engine 202 is configured to detect a change in system state based on the collected performance metrics 204 and updates the values of various tunable host and/or VM configuration parameters.

In one embodiment, tuning engine 202 is configured to, based on the performance metrics, characterize the system state in terms of different modes, each mode having a different set of host and VM configuration parameters selected to improve the functioning of the virtualized computing system for a certain range of use cases. For example, tuning engine 202 may initialize the system state to be in a "default mode" and set configurations to provide good performance for a wide range of workloads. Then, based on performance metrics, tuning engine 202 may re-characterize the system state to be in a "densely" provisioned state and shift into a corresponding "dense mode of operation." As described below, this dense mode of operation includes modifying configurations to improve performance for virtual workloads executing in a dense environment of many VMs, i.e., high VM consolidation ratio (which is another way of saying there are a large number of VMs 120 running on host 100, which can put pressure on memory and compute resources of the host).

FIGS. 2A and 2B depict host and VM configurations associated a default mode and with a dense mode, respectively. In one embodiment, tuning engine 202 may modify virtual NIC emulation settings, VM-related settings, hypervisor kernel resources and resource scheduling settings, and physical NIC settings based on the appropriate mode.

In one embodiment, tuning engine 202 modifies settings of components in charge of the VNIC receiving path to improve performance of a densely virtualized computing system. VMM 140 batches together network packets received by VNIC 126 and delivers the batched network packets to a VM 120 for handling according to a VNIC coalescing scheme. The VNIC coalescing scheme in effect coalesces interrupts from a VNIC to the VM such that the VM (and the underlying host) does not get overwhelmed and spend too many VCPU cycles (and PCPU cycles) processing interrupts. Under a default mode, as depicted in FIG. 2A, the VNIC coalescing scheme may be set to a "dynamic" setting, in which the VNIC emulator backend adjusts the packet delivery frequency based on the packet rate. For example, under a dynamic VNIC coalescing scheme, the VNIC emulator backend can be set to use rate-based coalescing with a target frequency of 4,000 interrupts per second, which the actual coalescing may exceed (when the packet rate is high) or be under (when the packet rate is low). According to one embodiment, under a dense mode of operation shown in FIG. 2B, tuning engine 202 modifies the VNIC coalescing scheme to a "static" setting for more aggressive batching, in which the VNIC emulator backend attempts to batch more network packets and deliver them at once. In contrast to a dynamic setting, the static VNIC coalescing scheme may provide a fixed or maximum interrupt delivery latency (e.g., no more than 4 milliseconds) for waiting before interrupting for the packet.

In another embodiment, tuning engine 202 modifies settings of components in charge of the VNIC transmitting path to improve performance of a densely virtualized computing system. Generally, hypervisor 114 allocates at least one system thread for each VNIC 126 to handle packet transmission for the corresponding VNIC. In one embodiment, under a dense mode of operation shown in FIG. 2B, tuning engine 202 may modify operations of hypervisor 114 to reduce the number of system threads spawned to handle VNIC transmitting. In one implementation, tuning engine 202 may reduce the number of system threads for VNIC packet transmission to be the same as the physical NIC transmitting queue by serializing the transmitting work done by the transmission threads. The serialization of the transmission work provides the virtualized computing system a chance to perform a more aggressive batching.

In one or more embodiments, tuning engine 202 modifies kernel resource scheduling based upon a system state change to improve performance of a densely virtualized computing system. Under a dense mode of operation, tuning engine 202 may modify the operations of hypervisor 114 to reduce the frequency of activating VNIC transmitting kernel threads such that more batching can be done. In another embodiment, tuning engine 202 may reduce the number of kernel threads running for hypervisor 114 for handling non-VM network traffic, i.e., network traffic related to (out of band) VM management. In this way, a more aggressive batch of network packets can be performed to save more CPU cycles for VMs. In yet another embodiment, tuning engine 202 may modify CPU affinity settings for I/O kernel threads associated with a particular VM. The affinity settings represent relationships between kernel threads and VMs that are taken into consideration when making scheduling decisions on the processor level.

In one or more embodiments, tuning engine 202 may be configured to modify the settings of components in charge of physical NIC 106 (PNIC) to perform more aggressive batching at the PNIC level and improve performance of a densely virtualized computing system. The PNIC 106 may have a configurable interrupt rate limit that determines a maximum amount of interrupts per second the PNIC will generate for incoming network packets (even if more packets arrive). In one implementation, tuning engine 202 directs a NIC device driver in device driver layer 144 of hypervisor 114 to reduce a configuration value for PNIC 106 and lower the PNIC interrupt rate. By lowering the PNIC interrupt rate, tuning engine 202 reduces the frequency of kernel receiving thread activations, which as a result might halt and pre-empt VCPUs and pollute their cache, causing higher virtualization overhead. It is noted that while conventional approaches might adjust interrupt throttle rate based on how much traffic is received, embodiments of the present disclosure lower the PNIC interrupt according to virtualized system load and performance (e.g., CPU load).

In another embodiment, tuning engine 202 may be configured to use fewer PNIC queues for receiving incoming network packets. Generally, a PNIC utilizes multiple queues to buffer incoming packet data off the wire of the PNIC. Under a dense mode of operation, tuning engine 202 may direct the NIC device driver in device driver 144 of hypervisor to de-activate (or later re-activate) a number of queues used by PNIC 106 at a given time based on the system state of the virtualized computing system. In some embodiments, the amount of space available to the PNIC queue may be reduced. The fewer number of PNIC queues causes a reduction in the number of kernel receiving threads being run concurrently. This effectively also reduces the chance to halt or pre-empt VCPUs of VMs executing in the virtualized computing system.

In embodiments where a dynamic allocation or reallocation of VMs to PNIC queues is performed, conventional implementations limit the number of packing and unpacking operations to be done in one iteration. When a system runs a large number of VMs, for example, potentially 12 or 15 times more than the number of PCPU cores (as in a densely virtualized computing system), this limitation may cause a longer convergence time. Accordingly, when operating in a dense mode, tuning engine 202 modifies settings of PNIC to change the packing and unpacking algorithms to be more aggressive to reduce the time it takes to stabilize the system.

Tuning engine 202 is further configured to reset some or all of the above configuration settings to their default settings in response to detecting the system state has changed back to a default mode. In other cases, tuning engine 202 may reset some or all of the above described configuration settings to their default settings in response to unexpected errors or failures, for example, unexpected kernel thread terminations, unexpected failures to collect performance metrics 204, or update system states periodically. This reset function prevents tuning engine 202 from hurting performance for regular use cases or under unexpected failures.

Figure 3:
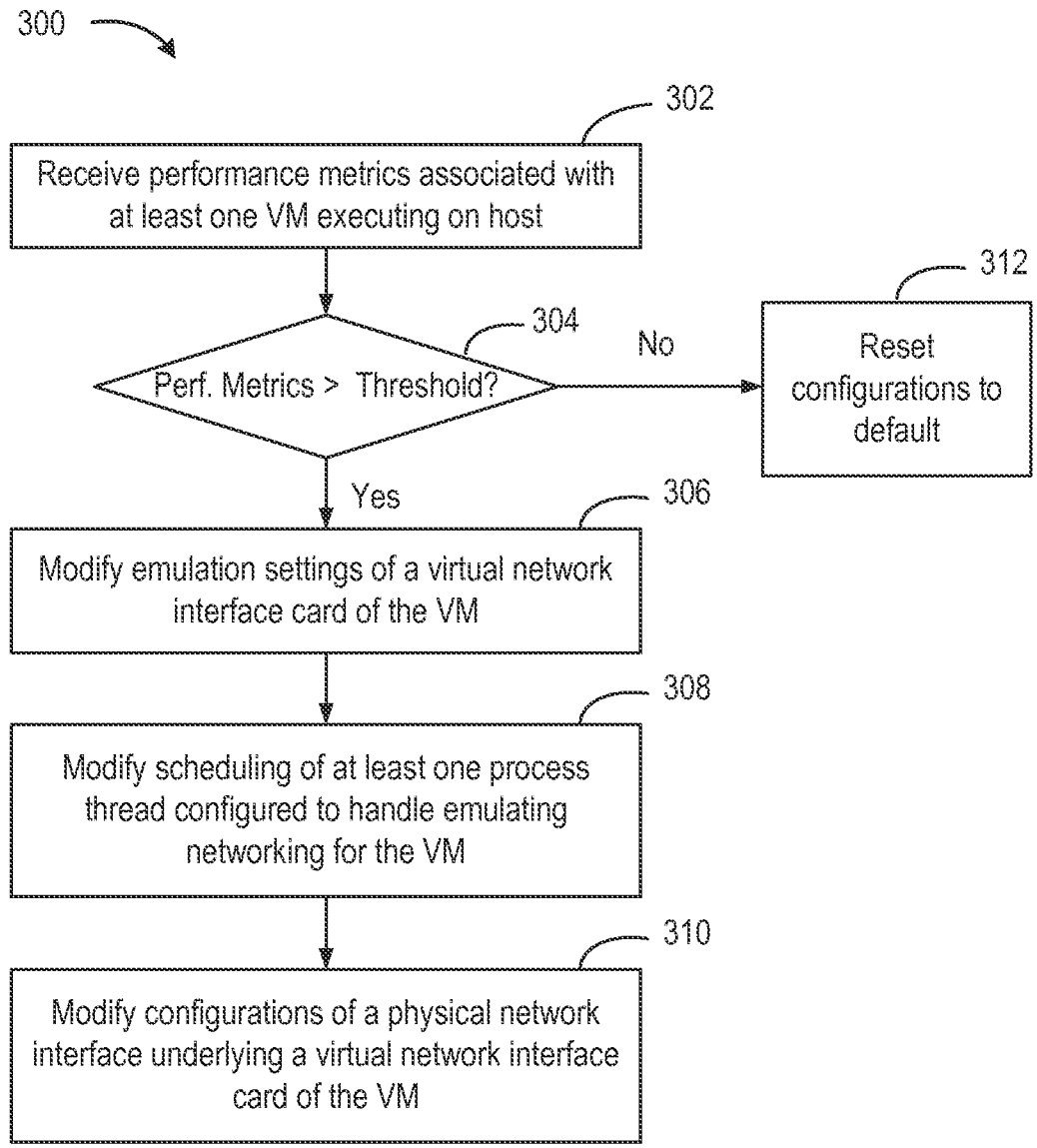
FIG. 3 is a flow diagram depicting a method for modifying a densely virtualized computing system, according to one embodiment of the present disclosure.

FIG. 3 is a flow diagram depicting a method 300 for modifying a densely virtualized computing system, according to one embodiment of the present disclosure. While embodiments of the present disclosure are described in terms of the systems described in FIGS. 1, 2A, and 2B, it should be recognized that other systems may be utilized to perform the described method. Furthermore, while method 300 is described in terms of tuning configuration settings for a single host 100, the described techniques for modifying host and VM configuration settings may be applied across multiple hosts, or across an entire data center.

Method 300 begins at step 302, where tuning engine 202 receives performance metrics 204 associated with at least one virtual machine (VM) executing on a host 100. In one embodiment, performance metrics 204 include metrics indicating the overall physical CPU load of host 100, metrics indicating a count of VMs 120 currently executing on host 100, metrics indicating load of a particular VM's vCPU 128, and metrics including a particular VM's CPU load. In some embodiments, performance metrics 204 include metrics indicating the load of one or more particular kernel thread(s) of hypervisor 114, including kernel threads configured to handling transmission or receiving of network packets for vNIC 126 or PNIC 106. It should be recognized that other forms of metrics may be utilized with embodiments of the present disclosure. The received performance metrics enable tuning engine 202 to determine the system state of host 100, i.e., whether the host is in a densely virtualized state that should trigger corresponding system tunings.

At step 304, tuning engine 202 determines whether at least one of, some, or all of performance metrics 204 exceed an associated threshold value. The thresholds comprise metric values representing threshold indications that the host is performing under a densely provisioned state. A densely provisioned state can be represented in absolute terms, i.e., when a specific threshold or set of thresholds exceeds a specific value, or in terms of the state's impact on system behavior or performance (e.g., when system memory is nearly fully utilized or available computer resources to VMs is significantly impacted by having to service too many interrupts). In one implementation, tuning engine 202 determines whether the number of VMs executing on host 100 is equal to or greater than the number of physical CPUs. In some implementations, tuning engine 202 determines whether the number of virtual CPUs is equal to or greater than two times of the number of physical CPUs. In some implementations, tuning engine 202 determines whether the overall system CPU load is equal to or greater than 50%. The threshold values may present default threshold values which can be customized by a system administrator for a more aggressive threshold or a more conservative threshold.

Tuning engine 202 may determine that the host is in a densely provisioned state based on the comparison of at least one performance metric to a corresponding threshold. As such, tuning engine 202 characterizes the system state as being in "dense mode" of operation and proceeds to step 306. At step 306, tuning engine 202 modifies emulation settings of a virtual network interface card 126 of the VM responsive to determining the performance metrics exceed a threshold. In some embodiments, tuning engine 202 modifies the emulation settings if the VM is not configured to execute a latency-sensitive workload. The VM may be marked (e.g., by a system administrator) as carrying a latency-sensitive workload, and tuning engine 202 may bypass this VM and not change its settings. In some embodiments, tuning engine 202 modifies the emulation settings to reduce a number of system threads handling transmission of packets on the virtual network interface card of the VM.

In some embodiments, tuning engine 202 modifies the virtual network interface card to increase the number of received network packets batched together to be delivered at once based on the performance metrics comprising CPU load of the host. In one implementation, tuning engine 202 may shift an interrupt coalescing scheme of the virtual network interface card from a rate-based algorithm to a static algorithm.

At step 308, tuning engine 202 modifies scheduling of at least one process thread configured to handle emulating networking for the VM responsive to determining that the host is in the densely provisioned state. In some embodiments, tuning engine 202 reduces a frequency of activating the at least one process thread (which handles transmission of network packets on the virtual network interface card) for execution on a physical CPU of the host. In other embodiments, tuning engine 202 reduces a number of kernel threads configured to handle non-virtual-machine-related traffic for the host responsive to determining that the host is in the densely provisioned state.

At step 310, tuning engine 202 modifies configurations of a physical network interface underlying a virtual network interface card of the VM responsive to determining that the host is in the densely provisioned state. In some embodiments, tuning engine 202 reduces an interrupt rate of the physical network interface card of the host based on the performance metrics comprising CPU load of the host. In some embodiments, tuning engine 202 reduces a number of queues allocated for the physical network interface card of the host.

At step 312, responsive to determining performance metrics 204 does not exceed a threshold value, tuning engine 202 may characterize the system state as being in a default mode of operation. When changing back to a default mode of operation, tuning engine 202 may reset any of the host and VM configuration settings modified as described herein back to a default setting. It should be recognized method 300 may be performed periodically and repeatedly during operation of host and its VMs. Tuning engine 202 continues to periodically receive updated performance metrics, re-evaluate the system state, and update the configuration settings as appropriate. Tuning engine 202 may also perform method 300 on each individual VM 120 executing on a host, to tune the settings for individual VMs.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method comprising:
   receiving at least one performance metric associated with at least one virtual machine (VM) executing on a host, the at least one performance metric comprising information indicative of a CPU load of the host;
   determining that the host is in a densely provisioned state based on a comparison of the information indicative of the CPU load of the host to a corresponding threshold;
   modifying settings of at least one virtual network interface card of the at least one VM responsive to determining that the host is in the densely provisioned state; and
   reducing a total number of queues allocated for handling traffic of a physical network interface underlying the at least one virtual network interface card of the at least one VM responsive to determining that the host is in the densely provisioned state.

2. The method of claim 1, wherein modifying settings of the at least one virtual network interface card is further responsive to determining that the VM is not configured to execute a latency-sensitive workload.

3. The method of claim 1, wherein modifying settings of the at least one virtual network interface card comprises:
   reducing a number of threads allocated for handling traffic for the at least one virtual network interface card.

4. The method of claim 3, wherein reducing the number of threads comprises reducing the number of threads to equal the number of queues.

5. The method of claim 1, wherein modifying settings of the at least one virtual network interface card comprises:
   increasing a number of received network packets at the at least one virtual network interface card batched together to be delivered at once to the at least one VM based on the information indicative of the CPU load of the host.

6. The method of claim 1, wherein modifying settings of the at least one virtual network interface card comprises:
   reducing a frequency of activating for execution on a physical CPU of the host at least one thread for handling traffic for the at least one virtual network interface card.

7. The method of claim 1, further comprising:
   reducing a number of kernel threads configured to handle non-virtual-machine-related traffic for the host responsive to determining that the host is in the densely provisioned state.

8. The method of claim 1, further comprising:
   reducing an interrupt rate of the physical network interface of the host based on the information indicative of the CPU load of the host.

9. The method of claim 4, wherein the traffic comprises packets transmitted by the host.

10. The method of claim 4, wherein the traffic comprises packets received by the host.

11. A non-transitory computer-readable storage medium comprising instructions that, when executed in a host computing device, manage a virtualized computing system, by performing the steps of:

receiving at least one performance metric associated with at least one virtual machine (VM) executing on the host, the at least one performance metric comprising information indicative of a CPU load of the host;
determining that the host is in a densely provisioned state based on a comparison of the information indicative of the CPU load of the host to a corresponding threshold;
modifying settings of at least one virtual network interface card of the at least one VM responsive to determining that the host is in the densely provisioned state; and
reducing a total number of queues allocated for handling traffic of a physical network interface underlying the at least one virtual network interface card of the at least one VM responsive to determining that the host is in the densely provisioned state.

12. The non-transitory computer-readable storage medium of claim 11, wherein modifying settings of the at least one virtual network interface card is further responsive to determining that the VM is not configured to execute a latency-sensitive workload.

13. The non-transitory computer-readable storage medium of claim 11, wherein modifying settings of the at least one virtual network interface card comprises:
reducing a number of threads allocated for handling traffic for the at least one virtual network interface card; and
increasing a number of received network packets at the at least one virtual network interface card batched together to be delivered at once to the at least one VM based on the information indicative of the CPU load of the host.

14. The non-transitory computer-readable storage medium of claim 11, wherein modifying settings of the at least one virtual network interface card comprises:
reducing a frequency of activating for execution on a physical CPU of the host at least one thread for handling traffic for the at least one virtual network interface card.

15. The non-transitory computer-readable storage medium of claim 11, wherein the steps further comprise:
reducing a number of kernel threads configured to handle non-virtual-machine-related traffic for the host responsive to determining that the host is in the densely provisioned state.

16. The non-transitory computer-readable storage medium of claim 11, wherein the steps further comprise:
reducing an interrupt rate of the physical network interface of the host based on the information indicative of the CPU load of the host.

17. A host computing system comprising:
a physical network interface; and
a processor configured to support execution of at least one virtual machine (VM) on the computing system, wherein the processor is further configured to:
receive at least one performance metric associated with the at least one VM executing on the host computing system, the at least one performance metric comprising information indicative of a CPU load of the host computing system;
determine that the host computing system is in a densely provisioned state based on a comparison of the information indicative of the CPU load of the host computing system to a corresponding threshold;
modify settings of at least one virtual network interface card of the at least one VM responsive to determining that the host computing system is in the densely provisioned state; and
reduce a total number of queues allocated for handling traffic of the physical network interface underlying the at least one virtual network interface card of the at least one VM responsive to determining that the host computing system is in the densely provisioned state.

18. The computing system of claim 17, wherein to modify settings of the at least one virtual network interface card is further responsive to that the VM is not configured to execute a latency-sensitive workload.

19. The computing system of claim 17, wherein the processor being configured to modify the settings of the virtual network interface card comprises the processor being configured to:
reduce a number of threads allocated for handling traffic for the at least one virtual network interface card; and
increase a number of received network packets at the at least one virtual network interface card batched together to be delivered at once to the at least one VM based on the information indicative of the CPU load of the host computing system.

20. The computing system of claim 17, wherein the processor configured to modify settings of the at least one virtual network interface card comprises the processor being configured to:
reduce a frequency of activating for execution on a physical CPU of the host computing system at least one thread for handling traffic for the at least one virtual network interface card.

21. The computing system of claim 17, wherein the processor is further configured to:
reduce a number of kernel threads configured to handle non-virtual-machine-related traffic for the host computing system responsive to determining that the host computing system is in the densely provisioned state.

22. The computing system of claim 17, wherein the processor is further configured to:
reduce an interrupt rate of the physical network interface of the host computing system based on the information indicative of the CPU load of the host.

* * * * *